United States Patent
Sabeur et al.

(10) Patent No.: US 11,178,597 B2
(45) Date of Patent: Nov. 16, 2021

(54) SYSTEMS AND METHODS FOR CELLULAR NETWORK SERVICE ALLOCATION

(71) Applicant: T-Mobile USA, Inc., Bellevue, WA (US)

(72) Inventors: Nassereddine Sabeur, Seattle, WA (US); Raymond Thomas Ball, Seattle, WA (US); Mehul Shah, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 22 days.

(21) Appl. No.: 16/877,214

(22) Filed: May 18, 2020

(65) Prior Publication Data
US 2020/0280903 A1 Sep. 3, 2020

Related U.S. Application Data

(62) Division of application No. 15/997,994, filed on Jun. 2, 2018, now Pat. No. 10,674,431.

(Continued)

(51) Int. Cl.
H04W 8/06 (2009.01)
H04W 48/04 (2009.01)
(Continued)

(52) U.S. Cl.
CPC ............ H04W 48/04 (2013.01); H04W 8/06 (2013.01); H04W 8/186 (2013.01); H04W 8/26 (2013.01); H04W 48/16 (2013.01); H04W 48/18 (2013.01)

(58) Field of Classification Search
CPC ....... H04W 48/04; H04W 8/06; H04W 8/186; H04W 8/26; H04W 48/16; H04W 48/18
See application file for complete search history.

(56) References Cited

U.S. PATENT DOCUMENTS 8,340,626 B2 12/2012 Edge
9,445,239 B2 9/2016 Reddy
(Continued)

FOREIGN PATENT DOCUMENTS

WO WO2017160682 9/2017
WO WO2017184103 10/2017

OTHER PUBLICATIONS

"3rd Generation Partnership Project; Technical Specification Group Services and System Aspects; Service Domain Centralization (Release 14)", 3GPP Standard; 3GPP TR 23.719, 3rd Generation Partnership Project (3GPP), Mobile Compeience Centre ; 650, Route Des Lucioles ; F-06921 Sophiaantipolis Cedex France, vol. SA WG2, No. V1 1.0, Aug. 17, 2016 (Aug. 17, 2016), pp. 1-45, XP051172390, [retrieved on Aug. 17, 2016].

(Continued)

Primary Examiner — Dai Phuong
(74) Attorney, Agent, or Firm — Lee & Hayes, P.C.

(57) ABSTRACT

Systems and methods for providing improved network service allocation. Rather than providing all-or-nothing network service allocation to users, the system can use the mobile country code (MCC) and mobile network code (MNC) to provide access to different services to different users. The services provided to each roaming user, for example, can be negotiated in a roaming agreement with the user's provider. The roaming user can then be provided access to only those services agreed to in the roaming agreement. A home provider can also use multiple MNCs to provide similar service allocation to home users, with each MNC providing a different combination of services. The home provider can also use mobile subscriber identification numbers (MSINs), or ranges of MSINs, to provide service allocation for home users.

20 Claims, 7 Drawing Sheets

Related U.S. Application Data

(60) Provisional application No. 62/618,521, filed on Jan. 17, 2018.

(51) Int. Cl.
*H04W 8/18* (2009.01)
*H04W 48/16* (2009.01)
*H04W 8/26* (2009.01)
*H04W 48/18* (2009.01)

(56) References Cited

U.S. PATENT DOCUMENTS

| | | |
|---|---|---|
| 2004/0127222 A1 | 7/2004 | Lee |
| 2004/0242215 A1 | 12/2004 | Chambers |
| 2008/0013470 A1 | 1/2008 | Kopplin |
| 2008/0020704 A1* | 1/2008 | Costa ................ H04M 15/41 455/3.06 |
| 2009/0082014 A1 | 3/2009 | Kryszkiewicz et al. |
| 2010/0309822 A1* | 12/2010 | Witzel ............... H04L 65/1096 370/259 |
| 2013/0165076 A1* | 6/2013 | Muratore ............ H04W 88/00 455/411 |
| 2014/0355520 A1 | 12/2014 | Wallis |
| 2015/0350874 A1 | 12/2015 | Draznin et al. |
| 2017/0142648 A1 | 5/2017 | Jiang et al. |
| 2018/0020343 A1 | 1/2018 | Noldus |
| 2018/0249316 A1 | 8/2018 | Moore et al. |
| 2018/0352528 A1 | 12/2018 | Kunz et al. |
| 2019/0223079 A1 | 7/2019 | Sabeur et al. |
| 2019/0288988 A1* | 9/2019 | Noldus ............... H04L 65/1069 |
| 2019/0320300 A1* | 10/2019 | Silver ................ H04L 65/103 |

OTHER PUBLICATIONS

European Search Report for European Patent Application No. 19741773.6, dated Jun. 15, 2021, 10 pages.

Office Action for U.S. Appl. No. 15/997,994, dated Oct. 23, 2019, Sabeur, "Systems and Methods for Cellular Network Service Allocation", 16 pages.

Office Action for U.S. Appl. No. 15/997,994, dated Jun. 11, 2019, Sabeur, "Systems and Methods for Cellular Network Service Allocation", 21 pages.

PCT Search Report and Written Opinion dated May 8, 2019 for PCT Application No. PCT/US2019/013703, 9 pages.

* cited by examiner

US 11,178,597 B2

SYSTEMS AND METHODS FOR CELLULAR NETWORK SERVICE ALLOCATION

CROSS-REFERENCE TO RELATED APPLICATIONS AND PRIORITY CLAIM

This application is a divisional of, and claims priority to, U.S. patent application Ser. No. 15/997,994, filed on Jun. 5, 2018, entitled "SYSTEMS AND METHODS FOR CELLULAR NETWORK SERVICE ALLOCATION", which is a non-provisional of, and claims priority under 35 U.S.C. § 119(e) to, U.S. Provisional Patent Application No. 62/618,521, filed Jan. 17, 2018, and entitled, "VoLTE Roaming Services Allocation Based on MCC MNC," the entire contents of which are hereby incorporated by reference as if fully set forth below.

BACKGROUND

When using a cellular network, in general, a user either has complete access to the network or no access to the network. Thus, unless a user's equipment (UE) lacks certain capabilities (e.g., it is too old to provide video playback), the UE is able to access all voice and data services (e.g., internet access, video calling, text messaging, etc.) over the network.

Similarly, when roaming, users generally also have complete access or no access. So, a user associated with first provider, but roaming on a second provider's network, has access to all voice and data services. Roaming contracts between providers tend not to contract out specific services because no practical mechanism existed to provide different levels of service (e.g., voice only, voice and text only, data only, etc.).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Examples of the present disclosure comprise systems and methods for allocating services on communications networks. The system can enable user equipment (UE) to access all services or to be restricted to a subset of available services. In some examples, the system can allocate services to roaming users, while enabling non-roaming, or "home," users to use all services. In other examples, services can be allocated to roaming and home users using one or more different mechanisms.

In some examples, the system can utilize information provided by the UE during attachment to allocate services. The system can use mobile country code (MCC) and mobile network code (MNC), for example, to differentiate between roaming and home users and to allocate services for roaming users. This can enable cellular network providers to negotiate different roaming agreements with different partners to reduce network traffic, increase fees, and to provide greater control over roaming users.

In some examples, the system can also use multiple MNCs for the same provider to enable the network provider to allocate services for home users. A single network provider may have four or five MNCs, for example, each associated with a different set of services. So, the network provider could offer voice only packages, voice and text only packages, data only packages, etc. In other examples, the network provider can use the international mobile subscriber identification (IMSI), or portions thereof (e.g., the mobile subscriber identification number (MSIN)) or ranges of IMSIs or MSINs, to allocate services, enabling the network provider to maintain a single MNC but provide different service packages.

Figure 1:
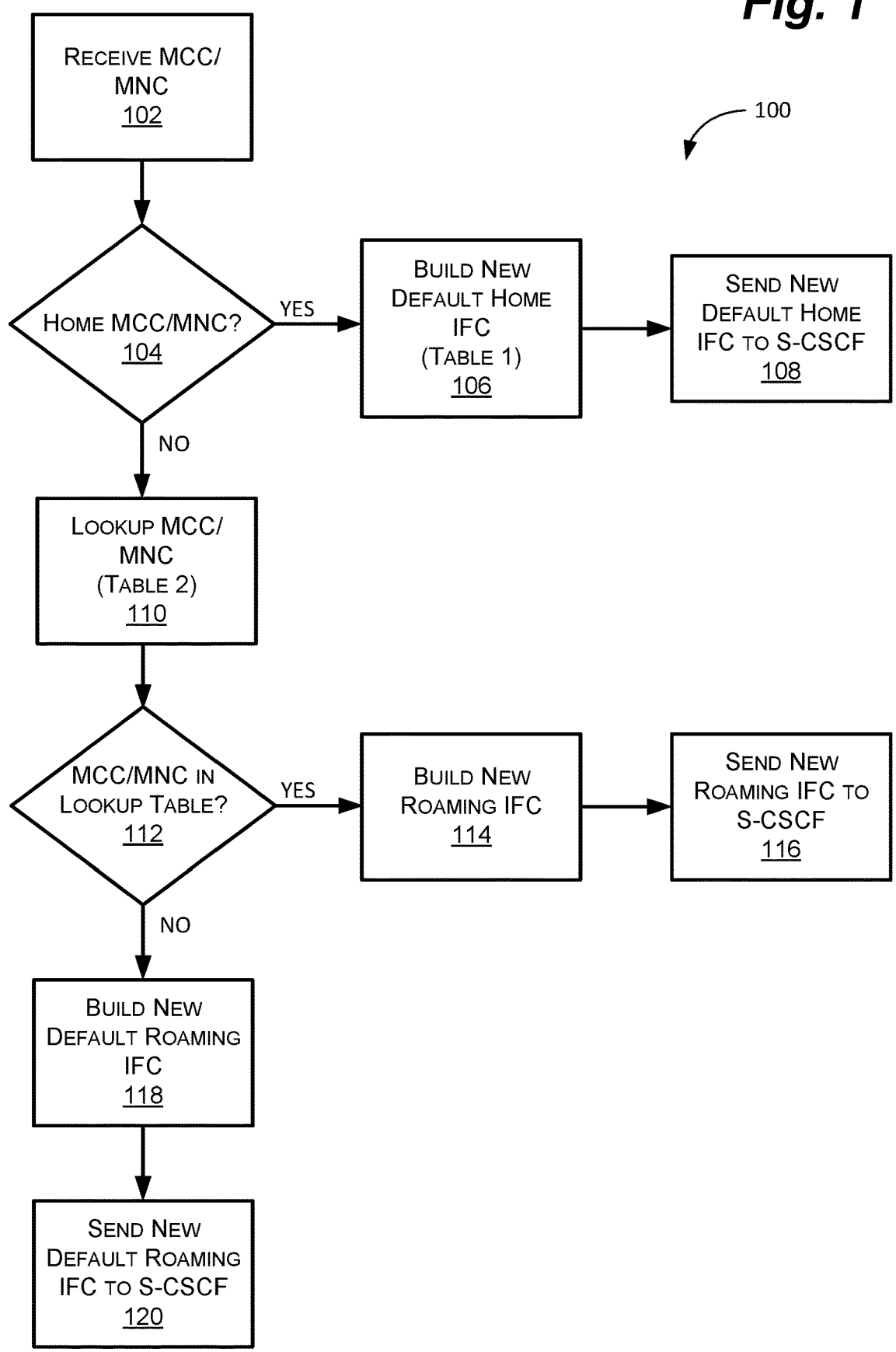
FIG. 1 is a flowchart depicting an example of a method for allocating services to user equipment (UE) on a communications network, in accordance with some examples of the present disclosure.

As discussed above, there is currently no way to allocate services between users (roaming or home users). As shown in FIG. 1, examples of the present disclosure can comprise a method 100 for determining whether a user is a home user or a roaming user and then allocating services to roaming users. This can enable roaming users to access only those services for which their network provider is authorized. This can enable providers to negotiate roaming agreements that include only those features that (1) the home provider is willing to provide, (2) the roaming partner is willing to pay for, and/or (3) the customer is willing to pay for or desires to use.

At 102, the provider can receive the MCC and MNC (via the IMSI) from the UE. This is generally done by sending a request (e.g., a session initiation protocol (SIP) request) from the UE to the cell tower to which the UE is trying to connect including the IMSI associated with the UE. The cell tower ultimately then sends the request to the home location register (HLR—for 2G and 3G networks) or the home subscriber server (HSS—for 4G LTE networks). For ease of description, these two terms are referred to herein as the HLR/HSS. The functions of these components are described in more detail below with respect to FIG. 4; but, the HLR/HSS is a central database that contains user-related and subscription-related information.

The MCC and MNC are included as part of the international mobile subscriber identity (IMSI) of the subscriber identification module (SIM) in the UE. The first three digits of the IMSI represent the MCC, the next three digits represent the MNC, and the remaining digits represent the MSIN. Thus, for phones provided in the U.S., for example, the MCC is currently one of three possibilities—310, 311, or 312. Of course, the number of MCCs can vary based on the number of providers, regions, or other factors in a particular country or region. The MNC is associated with the provider of the SIM, though each provider may have multiple MNCs for different purposes (e.g., pre-paid vs. postpaid, etc.), by region, etc. The MCC and MNC as utilized herein relates to the network with which the subscriber (and the UE) is registered—e.g., the roaming network or the home network for the UE.

At 104, using the database, the HLR/HSS can compare the MCC and MNC received from the UE during the attach request to the home network to determine if the UE us registered on the home network (e.g., the UE a "home UE") or a roaming network (e.g., the UE is a "roaming UE"). Thus, if the MNC is one of the MNCs assigned to the provider, then the UE belongs to a home subscriber. Conversely, if the MNC is not assigned to the provider, then the UE belongs to a roaming subscriber that is trying to connect to the network in roaming status.

If the UE is a home subscriber, then at 106, in some examples, the HLR/HSS can assign a "default home" initial filter criteria (IFC). The IFC controls what services the UE can access on the network. In some examples, home subscribers may have access to all services by default, as shown in Table 1:

TABLE 1

Default Home IFC

| Service A | Service B | Service C | Service D | Service E | Service F |
|---|---|---|---|---|---|
| Yes | Yes | Yes | Yes | Yes | Yes |

Where Services A-F can be any service provided on the network—e.g., voice calling, text messaging, video calling, internet access, etc. Because the UE belongs to a home subscriber, the home subscriber may have unfettered access to all services. Of course, Table 1 could be different for different MNCs for the same provider, as discussed below, or for different providers. If an MNC is linked to a provider that only provides pre-paid accounts, for example, the default home IFC may be more restrictive for this MNC.

At 108, regardless of the configuration of the default home IFC, the HLR/HSS can send the new default home IFC to the serving call session control function (S-CSCF). The S-CSCF handles registrations, retrieves user profiles, etc. to establish the session for the UE. The S-CSCF also allocates the application servers (ASs)—e.g., telephony application servers (TASs)—that enable the UE to access the appropriate functions based on the default home IFC. At this point, registration for the UE is complete and the UE has access to all, or a portion, of the network services according to the default home IFC.

If the MCC and MNC received by the HLR/HSS do not match the home network MCC and MNC, then the UE is a roaming UE (i.e., associated with a roaming subscriber). At 110, therefore, the HLR/HSS can look up the MCC and MNC in a lookup table. The lookup table can allocate services for the provider's roaming partners—those other providers that have negotiated at least some roaming privileges for their subscribers on the home network. As shown in Table 2, below, the services can be allocated in any manner negotiated by the parties.

TABLE 2

| Roaming Partner (MCC/MCC) | Service A | Service B | Service C | Service D | Service E | Service F |
|---|---|---|---|---|---|---|
| 111222 | Yes | No | Yes | Yes | No | Yes |
| 222333 | Yes | No | Yes | No | Yes | No |
| 333444 | No | Yes | No | Yes | Yes | Yes |
| 444555 | No | Yes | No | Yes | No | No |

As discussed above, Services A-F can be any services provided by the home network and can include, for example, voice calling, video calling, internet access, text messaging, etc. Of course, the MCCs and MNCs listed in the table are arbitrary and are only provided as examples. In reality, the MCCs and MNCs would be associated with the country and provider, respectively, of other providers with roaming agreements with the provider.

At 112, the HLR/HSS can determine if the MCC/MNC is located in the table. As mentioned above, MCC/MNCs located in the table can be associated with roaming partners that have entered into roaming agreements with the home provider. MCC/MNCs not located in the table, in turn, are associated with roaming partners that have no standing roaming agreement with the home provider. These may also be providers from another country that have not entered into a roaming agreement with the home provider simply because they are unaware of the home provider, for example, or have insufficient demand from customers to establish a formal roaming partnership with the home provider.

If the MCC/MNC is located in the lookup table (in this case, Table 2) then, at 114, the HLR/HSS can build a new roaming IFC according to the entries in the lookup table. Thus, the new roaming IFC can include only those services included in the roaming agreement. Some roaming agreements may include only voice calls, for example, but not data. Other roaming agreements may include voice and text, for example, but no internet access. Other roaming agreements may include all services.

At 116, the HLR/HSS can send the new roaming IFC to the S-CSCF. The S-CSCF can then establish the session for the UE. Notably, in this case, the S-CSCF can only establish sessions with those ASs associated with the services from the lookup table. In this example, for the MCC/MNC 111222, the S-CSCF can establish sessions with ASs associated with Services A, C, D, and F, but not Services B and E. In this manner, the roaming UE is given access only to those services negotiated by the roaming partner.

If the MCC/MNC is not located in the lookup table, this likely indicates that no roaming agreement exists between the roaming partner and the home provider. If this is the case, then at 118, the HLR/HSS can build a new default roaming IFC. The default roaming IFC can be set to anything the home provider chooses from full access to all services to no access to any services. Some providers may configure the default roaming IFC such that roaming UEs can access all services. This may be somewhat risky as the home provider may have to rely on the roaming partner to bill the customer and remit payment. This risk can be somewhat offset, however, by the higher prices often charged to roaming UEs. In other examples, the default roaming IFC may be set to enable roaming UEs only to make emergency calls, for example, or to make emergency calls and voice calls. This can reduce the risk to the home provider, but also limits potential income.

Regardless, at 120, the HLR/HSS can send the new default roaming IFC to the S-CSCF. The S-CSCF can then establish the session for the UE. Of course, in this case, the S-CSCF can only establish sessions with those ASs associated with the services listed in the default roaming IFC. This can include everything from establishing a session with an AS associated with every service on the network to establishing a single session with an AS associated with e-911 services, for example, to provide access to emergency services only.

The method 100 enables the home provider to distinguish between home UEs and roaming UEs and to establish greater control over roaming UEs on the home network. As mentioned above, this can enable the home provider to negotiate specific roaming agreements with roaming partners that include only those services agreed upon. This can also prevent unknown roaming UEs (i.e., UEs associated with providers that are not roaming partners) from using services for which payment may not be easily recouped.

Figure 2:
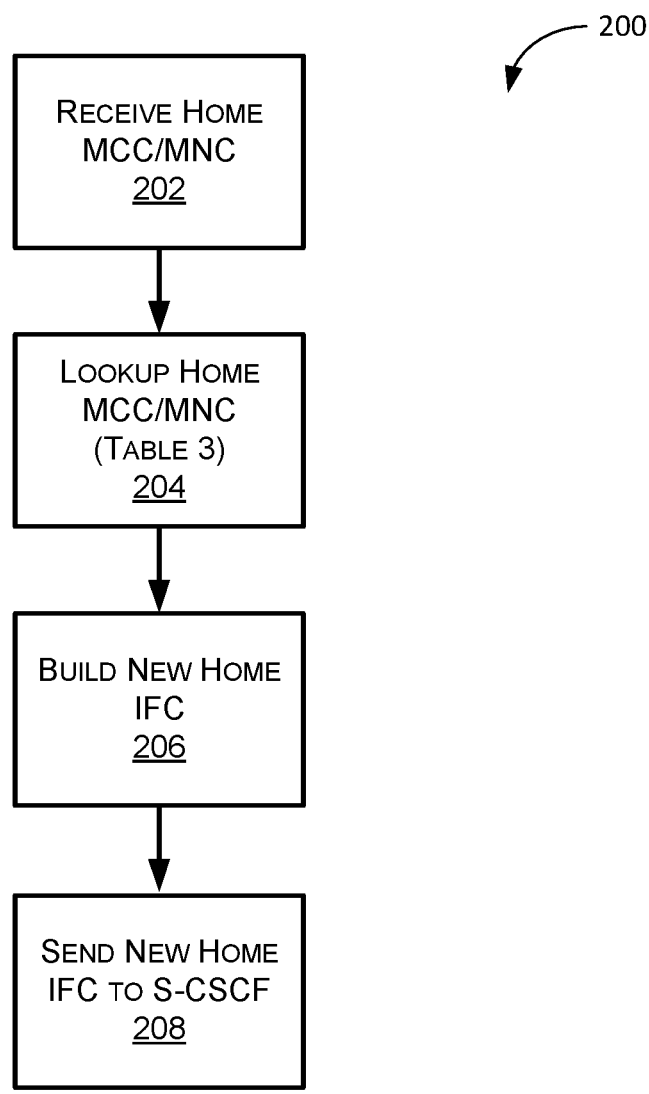
FIG. 2 is a flowchart depicting an example of a method for allocating services to home UE on the communications network, in accordance with some examples of the present disclosure.

As shown in FIG. 2, in some examples, rather than using a default home IFC (e.g., an IFC that includes all services), as discussed above, the home provider can utilize a method 200 that uses multiple home IFCs. Similar to the above, multiple home IFCs can enable the provider and/or users to pick and choose to which services various UEs have access. Parents may wish children to have access only to voice calling services, for example, and not text or internet. Similarly, a delivery or taxi service may wish to provide UEs to workers that can only send and receive text messages. The delivery or taxi service can then provide all dispatching and routing information to workers via text messaging.

Regardless of the reasons, in some examples, the home provider can establish a separate MNC for each type of account. The different MCC/MNCs can then be stored in a lookup table stored on, or accessible by, the HLR/HSS. Thus, while all MCC/MNCs stored in the table are associated with "home" UEs, each can be configured differently.

To this end, at 202, the HLR/HSS can receive the home MCC/MNC from the UE. The determination of home vs. roaming MCC/MNCs is discussed above in step 104. In this case, however, rather than simply using the default home IFC, at 204, the HLR/HSS can look up the home MCC/MNC in the lookup table to determine what services are associated with that MCC/MNC. An example lookup table is provided below in Table 3:

TABLE 3

| Home MCC/ MNC | Service A | Service B | Service C | Service D | Service E | Service F |
|---|---|---|---|---|---|---|
| 111100 | Yes | Yes | Yes | Yes | Yes | Yes |
| 111101 | No | No | No | No | Yes | No |
| 111102 | No | Yes | No | No | No | No |
| 111103 | No | Yes | No | No | Yes | No |

In this example, UE (or rather SIM) that include the "111100" MCC/MNC, for example, have access to all services. This may be the defacto default home IFC for the home provider. In other words, new customers may receive access to all services unless they express a desire to limit services, for example, or are associated with an account type (e.g., pre-paid) that is restricted in some way by default.

If a person or business expresses a desire to restrict access on the UE, on the other hand, the remaining MCC/MNCs can be used to generate IFCs for this purpose. UEs that include the "111101" MCC/MNC have access only to Service E, for example, while UEs that include the "111102" MCC/MNC have access only to Service B, etc. The "111101" MCC/MNC may be associated with an IFC that enables voice calls only, for example, while the "111103" MCC/MNC may be associated with an IFC that enables voice calls and text messaging. Of course, these examples, and the example MCC/MNCs above are offered merely to simplify the discussion and not intended to limit the possible MCC/MNCs, services, and combinations and permutations thereof.

At 206, the HLR/HSS can build a new home IFC according to the entries in the lookup table (in this case, Table 3). Similar to the new roaming IFC, discussed above, the new home IFC can include only those services included in Table 3 for that MCC/MNC. The new home IFC can then be included in a properly formatted message (e.g., a SIP message, or some other protocol).

At 208, the HLR/HSS can send the new home IFC to the S-CSCF. The S-CSCF can then establish the session for the UE. As before, the S-CSCF can establish sessions with those ASs associated with the services approved in the lookup table and not those that are restricted. In this example, for the "111100" MCC/MNC, the S-CSCF can establish sessions with ASs associated with all services; while for the "111101" MCC/MNC, the S-CSCF can establish a session only with the AS associated with Service E. In this manner, the home provider can enable greater control over the services used by customers. This can be beneficial for the home provider to minimize risk, for example (e.g., limiting pre-paid phones to text and voice call only). This can also enable customers to control network access for personal or business reasons, as discussed above.

Figure 3:
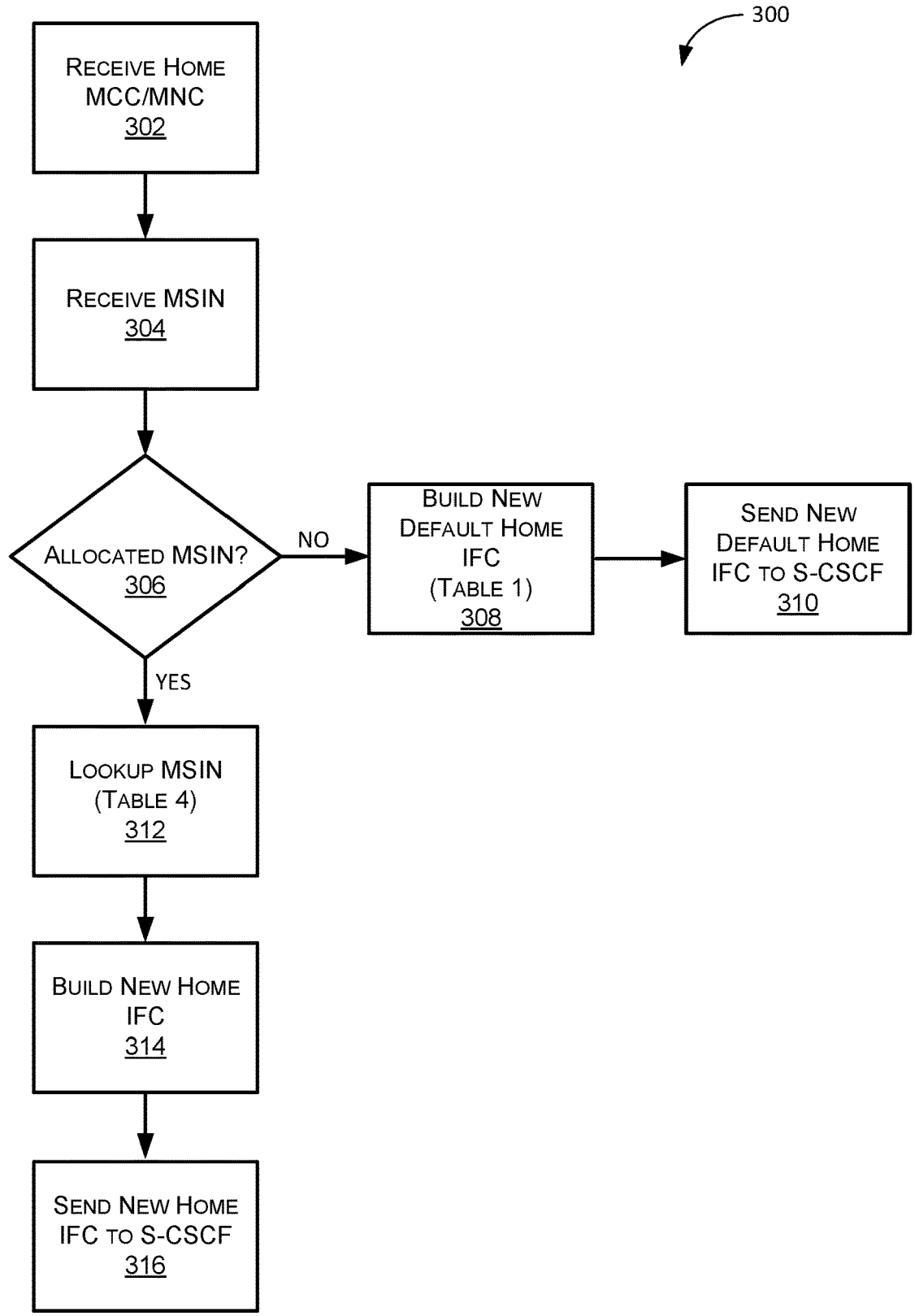
FIG. 3 is a flowchart depicting an example of another method for allocating services to home UE on the communications network, in accordance with some examples of the present disclosure.

As shown in FIG. 3, in other examples, the home provider can also use the MSIN of the IMSI to determine what IFC to build for each UE. In this manner, all SIMs can include the same MCC/MNC, but the MSIN, or ranges of MSINs, can be used to allocate services. This can enable the home provider to allocate services without using multiple MNCs, for example, which may reduce licensing and regulatory costs. This can also enable the home provider to provide even higher granularity in the allocation of services because any number of ranges can be used—even down to individual MSINs.

To this end, at 302, the HLR/HSS can receive the MCC/MNC from the UE at attachment. In this case, however, it is possible for the MCC/MNC to be the same for all UE. Thus, the MCC/MNC serves only to establish the UE as a home UE. At 304, therefore, the HLR/HSS can next receive the MSIN from the UE (or the HLR/HSS can receive the entire IMSI at the same time and parse it as necessary). As discussed above, the MSIN is the number in the IMSI after the MCC/MNC that individually identifies the SIM installed in the UE. It is essentially a serial number for the SIM for the home provider.

At 306, the HLR/HSS can determine if the MSIN is an "allocated MSIN." In other words, as above, in some examples, the "default" IFC may provide the UE with access to all services (or some other default profile). Thus, the provider can have "unallocated MSIN" (or ranges of MSIN) that have access to all services, for example, and "allocated MSIN" that have restricted, or no, access to at least one service. Restricted access can include an MSIN that has access to voice calling, for example, but only for 100 minutes per month. After 100 minutes of talk time, voice calling can be deactivated for the rest of the month.

If the MSIN is determined to be unallocated, then at 308, the HLR/HSS can build a new default home IFC. As before, the default can include all, or a portion, of the services, as configured by the home provider. In some examples, the default IFC can include access to all services. In other examples, the default IFC can include access to all services except "premium" services, which must be manually added to the user's account. In still other examples, such as for discount providers, the default IFC may enable only voice and text messaging. Regardless, at 310, the HLR/HSS can send the new default home IFC to the S-CSCF to establish the session, as discussed above.

If the MSIN is determined to be an allocated MSIN, on the other hand, then at 312, the HLR/HSS can look up the MSIN in a lookup table. The lookup table can include ranges of MSINs or even individual MSINs and the services allocated to each. Table 4, below, shows an example lookup table using ranges of MSIN:

TABLE 4

| Home MCC/MNC | MSIN | Service A | Service B | Service C | Service D | Service E | Service F |
|---|---|---|---|---|---|---|---|
| 111100 | 0001-0100 | Yes | Yes | Yes | Yes | No | Yes |
| 111100 | 0101-0200 | No | Yes | Yes | No | Yes | No |
| 111100 | 0201-0300 | No | Yes | No | Yes | No | Yes |
| 111100 | 0301-0400 | No | Yes | No | No | Yes | No |

At 314, the HLR/HSS can build a new home IFC according to the entries in the lookup table (in this case, Table 4). As before, the new home IFC can include only those services included in Table 4 for that MSIN. The new home IFC can then be included in a properly formatted message.

At 316, the HLR/HSS can send the new home IFC to the S-CSCF. The S-CSCF can then establish the session for the UE. As before, the S-CSCF can establish sessions only with those ASs associated with the services authorized in the lookup table. In this example, for the MSINs in the 0001-0100 range, for example, the S-CSCF can establish sessions with ASs associated with all services except Service E; while for MSINs in the 0101-0200 range, the S-CSCF can establish sessions only with the AS associated with Services B, C, and E. In this manner, the home provider can enable greater control over the services used by customers without licensing so many MNCs.

Figure 4:
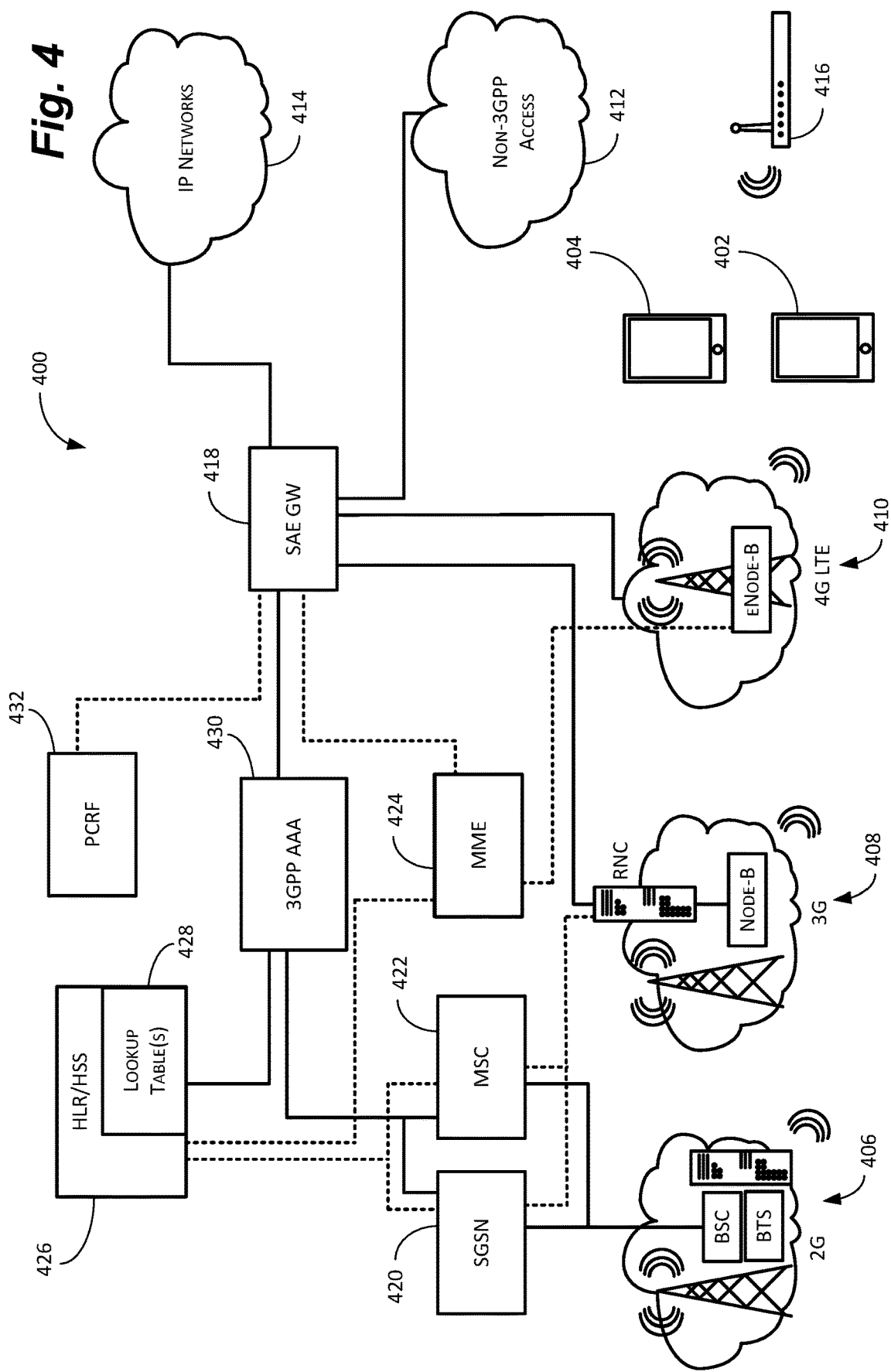
FIG. 4 is an example of a communications network for use with the system, in accordance with some examples of the present disclosure.

FIG. 4 depicts a conventional cellular network 400 including a home UE 402 and a roaming UE 404, as discussed above. The network 400 also includes 2G 406, 3G 408, and 4G long-term evolution (LTE) 410 components. Of course, future technologies, such as, for example, 5G and device-to-device (D2D) components could also be included and are contemplated herein. As mentioned above, many of the "back-end" components of the network 400 could handle some, or all, of the methods 100, 200, 300 discussed herein. Indeed, some, or all, of the aforementioned call lookup tables 428 (e.g., Tables 1-4) could be stored in the HLR/HSS 426, as discussed, or could be stored on other components, such as the 3GPP AAA server 430, or other components, and accessible to the HLR/HSS 426.

As is known in the art, data can be routed from the Internet or other sources using a circuit switched modem connection (or non-3GPP connection) 412, which provides relatively low data rates, or via IP based packet switched 414 connections, which results in higher bandwidth. The LTE system 410, which is purely IP based, essentially "flattens" the architecture, with data going straight from the internet to the service architecture evolution gateway (SAE GW) 418 to evolved Node B transceivers 410, enabling higher throughput. Many UEs 402, 404 also have wireless local area network (WLAN) 416 capabilities, in some cases enabling even higher throughput. In some cases, cellular carriers may use WLAN communications in addition to, or instead of, cellular communications to supplement bandwidth.

The serving GPRS support node (SGSN) 420 is a main component of the general packet radio service (GPRS) network, which handles all packet switched data within the network 400—e.g. the mobility management and authentication of the users. The MSC 422 essentially performs the same functions as the SGSN 420 for voice traffic. The MSC 422 is the primary service delivery node for global system for mobile communication (GSM) and code division multiple access (CDMA), responsible for routing voice calls and short messaging service (SMS) messages, as well as other services (such as conference calls, fax, and circuit switched data). The MSC 422 sets up and releases the end-to-end connection, handles mobility and hand-over requirements during the call, and takes care of charging and real time pre-paid account monitoring.

Similarly, the mobility management entity (MME) 424 is the key control-node for the 4G LTE network 410. It is responsible for idle mode UEs 402, 404 paging and tagging procedures including retransmissions. The MME 424 is involved in the bearer activation/deactivation process and is also responsible for choosing the SAE GW 418 for the UEs 402, 404 at the initial attach and at time of intra-LTE handover involving core network (CN) node relocation (i.e., switching from one cell tower to the next when traveling). The MME 424 is responsible for authenticating the user (by interacting with the HLR/HSS 426 discussed below). The non-access stratum (NAS) signaling terminates at the MME 424 and it is also responsible for generation and allocation of temporary identities to UEs 402, 404. The MME 424 also checks the authorization of the UEs 402, 404 to camp on the service provider's HPLMN or VPLMN and enforces UEs 402, 404 roaming restrictions on the VPLMN. The MME 424 is the termination point in the network for ciphering/integrity protection for NAS signaling and handles the security key management. The MME 424 also provides the control plane function for mobility between LTE 410 and 2G 406/3G 408 access networks with the S3 interface terminating at the MME 424 from the SGSN 420. The MME 424 also terminates the Sha interface towards the home HLR/HSS 426 for roaming UEs 402, 404.

The HLR/HSS 426 is a central database that contains user-related and subscription-related information. The functions of the HLR/HSS 426 include functionalities such as mobility management, call and session establishment support, user authentication and access authorization. The HSS, which is used for LTE connections, is based on the previous HLR and authentication center (AuC) from CGMA and GSM technologies, with each serving substantially the same functions for their respective networks.

In this case, the HLR/HSS 426 can also store, or have access to, the lookup tables 428 (e.g., Tables 1-4) and can provision the UEs 402, 404. For roaming UEs 404, for example, the HLR/HSS 426 can build IFCs based on their MCC and MNC (for roaming partners) or using a default roaming IFC for UEs 404 (for non-partners). The HLR/HSS 426 can also provision home UEs 402 using multiple MNCs and/or MSINs or ranges of MSINs. The lookup tables 428 can be stored on the HLR/HSS 426, for example, or can be stored on another network entity (e.g., the MME 424 or 3GPP AAA server 430) and can be accessible to the HLR/HSS 426.

The policy and charging rules unction (PCRF) 432 is a software node that determines policy rules in the network 400. The PCRF 432 generally operates at the network core and accesses subscriber databases (e.g., the HLR/HSS 426)

and other specialized functions, such as enhanced e911 call handling, in a centralized manner. The PCRF 432 is the main part of the network 400 that aggregates information to and from the network 400 and other sources (e.g., IP networks 414). The PCRF 432 can support the creation of rules and then can automatically make policy decisions for each subscriber active on the network 400. The PCRF 432 can also be integrated with different platforms like billing, rating, charging, and subscriber database or can also be deployed as a standalone entity.

Finally, the 3GPP AAA server 430 performs authentication, authorization, and accounting (AAA) functions and may also act as an AAA proxy server. For WLAN 416 access to (3GPP) IP networks 414 the 3GPP AAA Server 430 provides authorization, policy enforcement, and routing information to various WLAN components. The 3GPP AAA Server 430 can generate and report charging/accounting information, perform offline charging control for the WLAN 416, and perform various protocol conversions when necessary. As discussed above, in some examples, the 3GPP AAA server 430 can contain some, or all, of the lookup tables 428 for allocating services.

Figure 5:
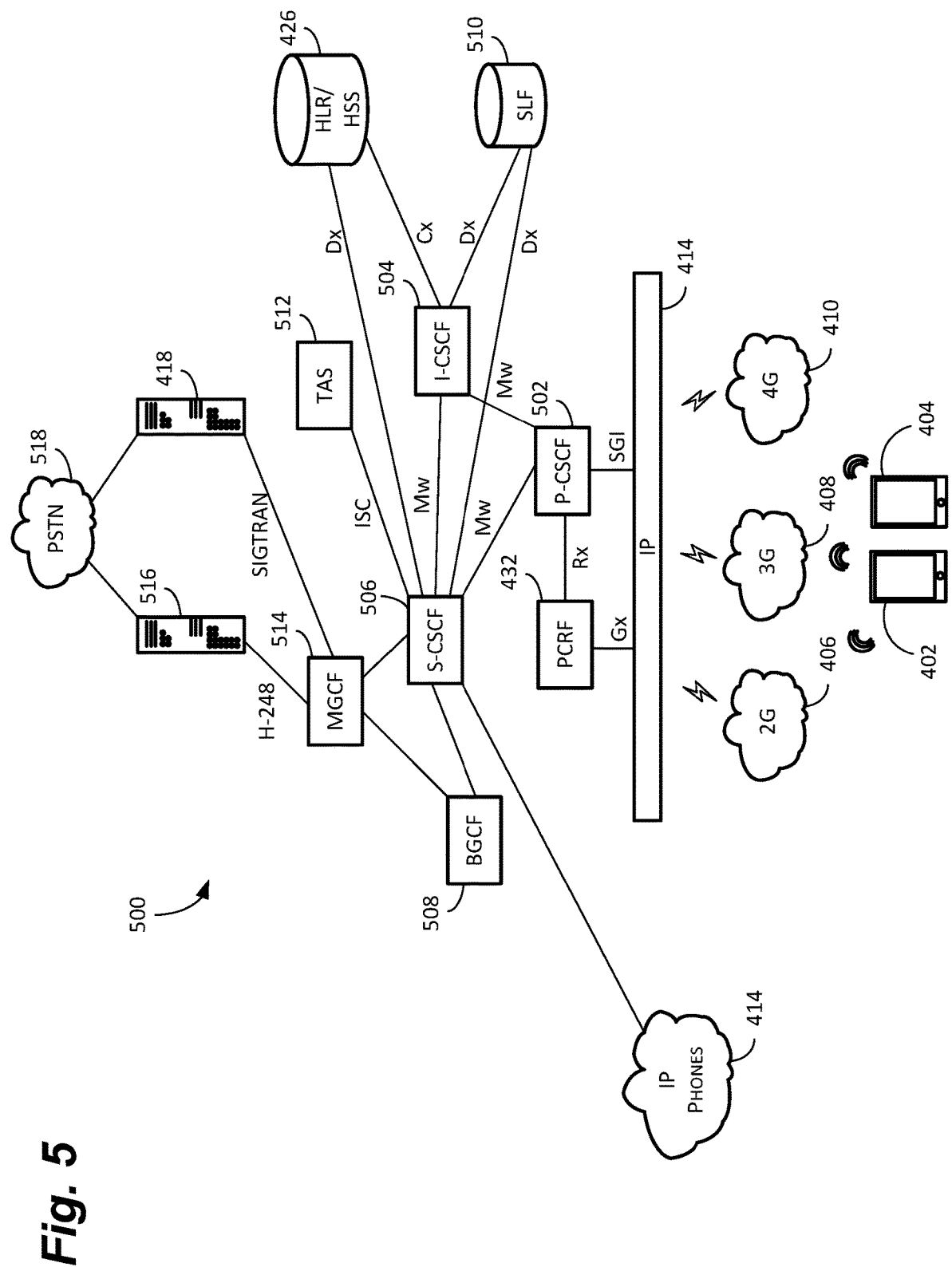
FIG. 5 is an example of an internet protocol multimedia subsystem (IMS) for use with the system, in accordance with some examples of the present disclosure.

FIG. 5 includes a more detailed view of the components of the internet protocol multimedia subsystem (IMS) 500 for the LTE network 410, which includes the aforementioned S-CSCF 506. As shown, the IMS 500 includes several network components for routing signals, storing subscriber information, and connecting across various subsystems and network types. The IMS 500 is built on SIP as the base to further support packaging of voice, video, data, fixed, and mobile services on a single platform to end users. It enables communications across multiple types of networks, including cellular, satellite, broadband, cable, and fixed networks, and enables the creation of efficient interoperating networks.

As mentioned above, the IMS 500 provides interoperability for UEs 402, 404 and other devices across multiple platforms including, for example, 2G 406, 3G 408, 4G 410, IP 414 networks. The IMS 500 also includes some components already discussed more generally in FIG. 4. These include, for example, the PCRF 432, HLR/HSS 426 and SAE GW 418.

The IMS 500 also includes a proxy-call session control function (P-CSCF) 502. The P-CSCF 502 is the entry point to the IMS 500 and serves as the outbound proxy server for the UEs 402, 404. The UEs 402, 404 attach to the P-CSCF 502 prior to performing IMS registrations and initiating SIP sessions. The P-CSCF 502 may be in the home domain of the IMS operator, or it may be in the visiting domain, where the UE 404 is currently roaming. For attachment to a given P-CSCF 502, the UEs 402, 404 perform P-CSCF 502 discovery procedures. Attachment to the P-CSCF 502 enables the UEs 402, 404 to initiate registrations and sessions with the IMS 500.

The IMS 500 also includes an interrogating-call session control function (I-CSCF) 504. The I-CSCF 504 acts as an inbound SIP proxy server in the IMS 500. During IMS registrations, the I-CSCF 504 queries the HLR/HSS 426 to select the appropriate S-CSCF 506 (discussed below) which can serve the UEs 402, 404. During IMS 500 sessions, the I-CSCF 504 acts as the entry point to terminating session requests. The I-CSCF 504 routes the incoming session requests to the S-CSCF 506 of the called party.

The IMS 500 also includes a serving-call session control function (S-CSCF) 506. The S-CSCF 506 acts as a registrar server, and in some cases as a redirect server. The S-CSCF 506 facilitates the routing path for mobile originated or mobile terminated session requests. The S-CSCF 506 also interacts with various components for playing tones and announcements, among other things. As discussed above, the S-CSCF 506 can receive the IFCs from the HLR/HSS 426 and establish the appropriate sessions with telephony application servers (TASs) 512 according to the services included in the IFC.

The IMS 500 also includes a breakout gateway control function (BGCF) 508. The BGCF 508 is the IMS 500 element that selects the network in which PSTN 518 (discussed below) breakout is to occur. If the breakout is to occur in the same network as the BGCF 508, for example, then the BGCF 508 selects a media gateway control function (MGCF) 514 (also discussed below) that will be responsible for interworking with the PSTN 518. The MGCF 514 then receives the SIP signaling from the BGCF 508.

The IMS 500 also includes a subscriber location function (SLF) 510. The SLF 510 provides information about the HLR/HSS 426 that is associated with a particular user profile. It is generally implemented using a database. If the IMS 500 contains more than one HLR/HSS 426, I-CSCF 504 and S-CSCF 506 will communicate with SLF 510 to locate the appropriate HLR/HSS 426 based on the user profile.

The IMS 500 also includes the aforementioned TAS 512. As the name implies, the TAS 512, sometimes known in a telephony context only as an application server (AS), is a component used to provide telephony applications and additional multimedia functions. The TAS 512 can include any entity in a telephone network that carries out functions that are not directly related to the routing of messages through the network. Such functions can include, for example, in-network answering machines, automatic call forwarding, conference bridges and other types of applications. And, while shown as a single entity in FIG. 5, multiple TASs 512 are generally used to provide multiple services. Based on the IFC provided to the S-CSCF 506, for example, the S-CSCF 506 can establish sessions with one or more TASs 512, one TAS 512 for each service in the IFC.

The IMS 500 also includes the MGCF 514. The MGCF 514 is a SIP endpoint that handles call control protocol conversion between SIP and ISDN user part (ISUP)/bearer-independent call control (BICC) and interfaces with the SAE GW 418 over stream control transmission protocol (SCTP). The MGCF 514 also controls the resources in a media gateway (MGW) 516 across an H.248 interface. The MGW 516 is a translation device or service that converts media streams between disparate telecommunications technologies such as POTS, SS7, next generation networks (2G 406, 3G 408, and 4G 410) or private branch exchange (PBX) systems.

Finally, the IMS 500 also includes a public switched telephone network (PSTN) 518. The PSTN 518 is the world's collection of interconnected voice-oriented public telephone networks, both commercial and government-owned. It's also referred to as the plain old telephone service (POTS). With respect to IP phones (on the IP network 414), for example, the PSTN 518 furnishes much of the Internet's long-distance infrastructure. Because Internet service providers (ISPs) pay long-distance providers for access to their infrastructure and share the circuits among many users through packet-switching (discussed above), Internet users avoid having to pay usage tolls to anyone other than their ISPs.

Figure 6:
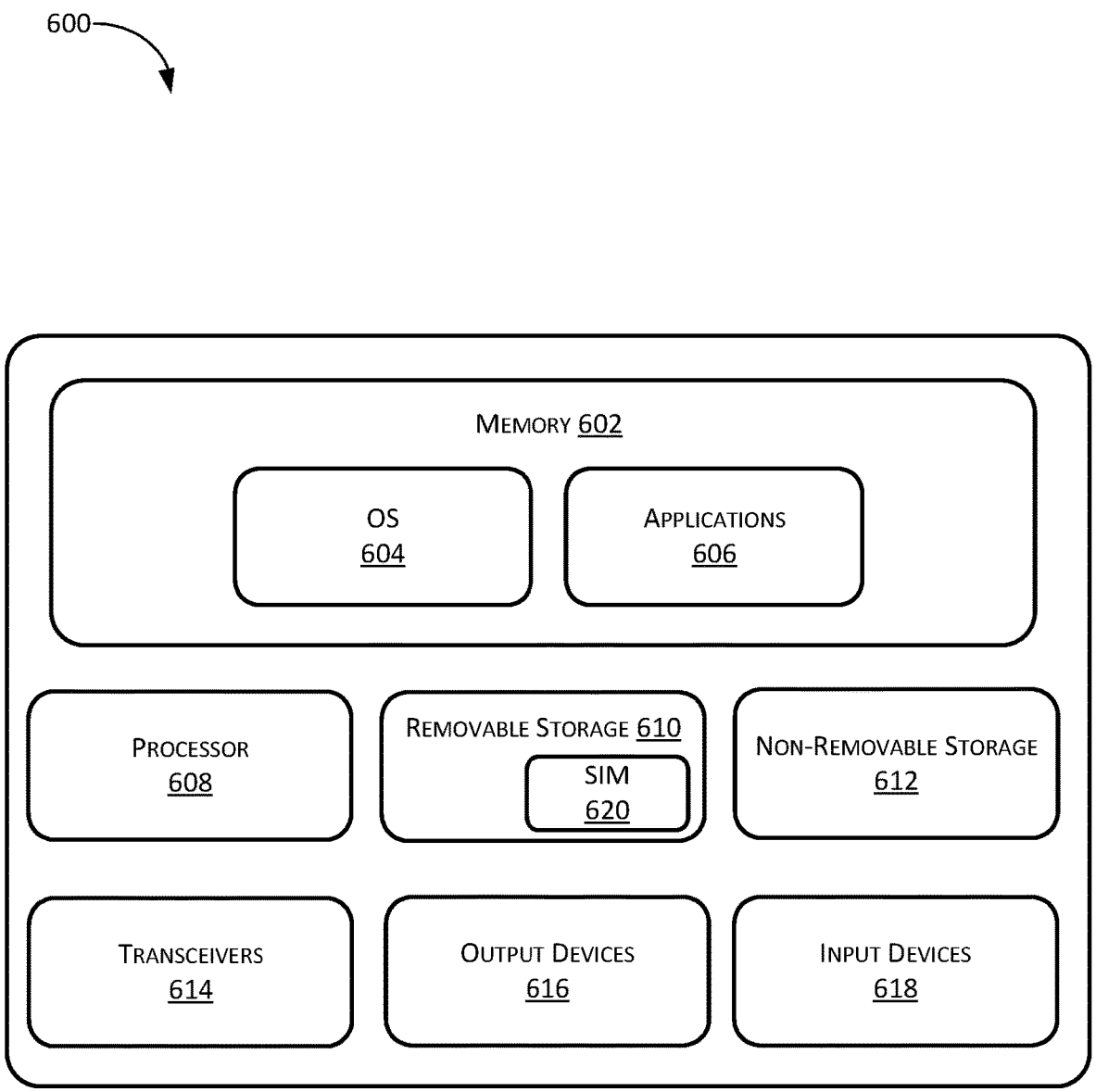
FIG. 6 is an example of a UE for use with the systems and methods disclosed herein, in accordance with some examples of the present disclosure.

FIG. 6 depicts a component level view of a UE 600 (e.g., any of the UEs 402, 404) for use with the methods 100, 200, 300 described herein. The UE 600 could be any UE suitable for use on the network 400. For clarity, the UE 600 is described herein generally as a cell phone or smart phone. One of skill in the art will recognize, however, that the methods 100, 200, 300 described herein can also be used with a variety of other electronic devices, such as, for example, tablet computers, laptops, desktops, and other network (e.g., cellular or IP network) connected devices.

Notably, the methods 100, 200, 300 described herein can be used with unmodified UEs 600 (e.g., UEs 402, 404). In other words, UEs 600 already contain the IMSI, which is all that is required from the UE 600 for the methods 100, 200, 300 to operate. On UEs 600 that use SIMs 620 (e.g., global system for mobile communications, or GSM, phones), for example, the IMSI is stored on the SIM 620. For other types of phones (e.g., code division multiple access, or CDMA phones), the IMSI can be stored in the phone directly or in the removable user identity module (R-UIM) card (the CDMA analogue to a SIM 620 for GSM). Thus, while the UEs 600 are discussed generally herein as UEs 600 with SIMs 620, all types of network connected devices are contemplated. As discussed above, the IMSI contains all of the information needed to implement the methods 100, 200, 300—i.e., the MCC, MNC, and, where applicable, the MSIN.

The UE 600 can comprise several components to execute the above-mentioned functions. As discussed below, the UE 600 can comprise memory 602 including the operating system (OS) 604. The UE 600 can also comprise common applications 606 such as, for example, contacts, calendars, call logs, voicemail, etc. In this case, the UE 600 can also comprise a SIM 620 (or similar) that can store the IMSI, among other things. The UE 600 can also comprise one or more processors 608. The UE 600 can also include one or more of removable storage 610, non-removable storage 612, transceiver(s) 614, output device(s) 616, and input device(s) 618.

In various implementations, the memory 602 can be volatile (such as random access memory (RAM)), non-volatile (such as read only memory (ROM), flash memory, etc.), or some combination of the two. The memory 602 can include all, or part, of the applications 606 and the OS 604 for the UE 600, among other things. In some examples, rather than being stored in the memory 602, some, or all, of the functions and messages can be stored on a remote server or cloud of servers accessible by the UE 600.

The memory 602 can also include the OS 604. Of course, the OS 604 varies depending on the manufacturer of the UE 600 and currently comprises, for example, iOS 11.2.6 for Apple products and Oreo for Android products. The OS 604 contains the modules and software that support the UE's basic functions, such as scheduling tasks, executing applications, and controlling peripherals. In some examples, the OS 604 can receive signals from the applications 606, for example, to cause the UE 600 to store data, download files, and transmit data to the HLR/HSS 426 and other network entities. The OS 604 can also enable the UE 600 to send and retrieve data via an internet connection (e.g., WLAN 416) and perform other functions.

The UE 600 can also comprise one or more processors 608. In some implementations, the processor(s) 608 can be a central processing unit (CPU), a graphics processing unit (GPU), or both CPU and GPU, or any other sort of processing unit. The UE 600 may also include additional data storage devices (removable and/or non-removable) such as, for example, magnetic disks, optical disks, or tape. Such additional storage is illustrated in FIG. 6 by removable storage 610 and non-removable storage 612. The removable storage 610 and non-removable storage 612 can store some, or all, of the functions 606 and/or the OS 604.

Non-transitory computer-readable media may include volatile and nonvolatile, removable and non-removable tangible, physical media implemented in technology for storage of information, such as computer readable instructions, data structures, program modules, or other data. The memory 602, removable storage 610, and non-removable storage 612 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UE 600. Any such non-transitory computer-readable media may be part of the UE 600 or may be a separate database, databank, remote server, or cloud-based server.

In some implementations, the transceiver(s) 614 include any sort of transceivers known in the art. In some examples, the transceiver(s) 614 can include wireless modem(s) to facilitate wireless connectivity with the other UE, the Internet, and/or an intranet via the cellular network 400. Further, the transceiver(s) 614 may include a radio transceiver that performs the function of transmitting and receiving radio frequency communications via an antenna (e.g., Wi-Fi or Bluetooth®). In other examples, the transceiver(s) 614 may include wired communication components, such as a wired modem or Ethernet port, for communicating with the other UE or the provider's Internet-based network. The transceiver(s) 614 can enable the UE 400 to upload and download data, transmit the IMSI to the HLR/HSS 426, and ultimately communicate with the TASs 512 via a cellular or internet data connection.

In some implementations, the output device(s) 616 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, when a file has completed downloading, when a roaming connection is established, or to signify other events. Output device(s) 616 also include ports for one or more peripheral devices, such as headphones, peripheral speakers, or a peripheral display.

In various implementations, input device(s) 618 include any sort of input devices known in the art. For example, the input device(s) 618 may include a camera, a microphone, a keyboard/keypad, or a touch-sensitive display. A keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. In some examples, the UE 600 can include a touchscreen, for example, to enable the user to make selections in the applications 606, start downloads, etc.

In some examples, the UE 600 can also include the SIM 620 (or similar). As discussed above, the SIM can include the IMSI, which, in turn, contains the MCC, MNC, and MSIN. The OS 604 can retrieve the IMSI from the SIM 620, for example, and then transmit some or all of the IMSI to the HLR/HSS 426 via the transceivers 614. As mentioned above, some types of UE 600 use internal memory or other devices to store the IMSI.

Figure 7:
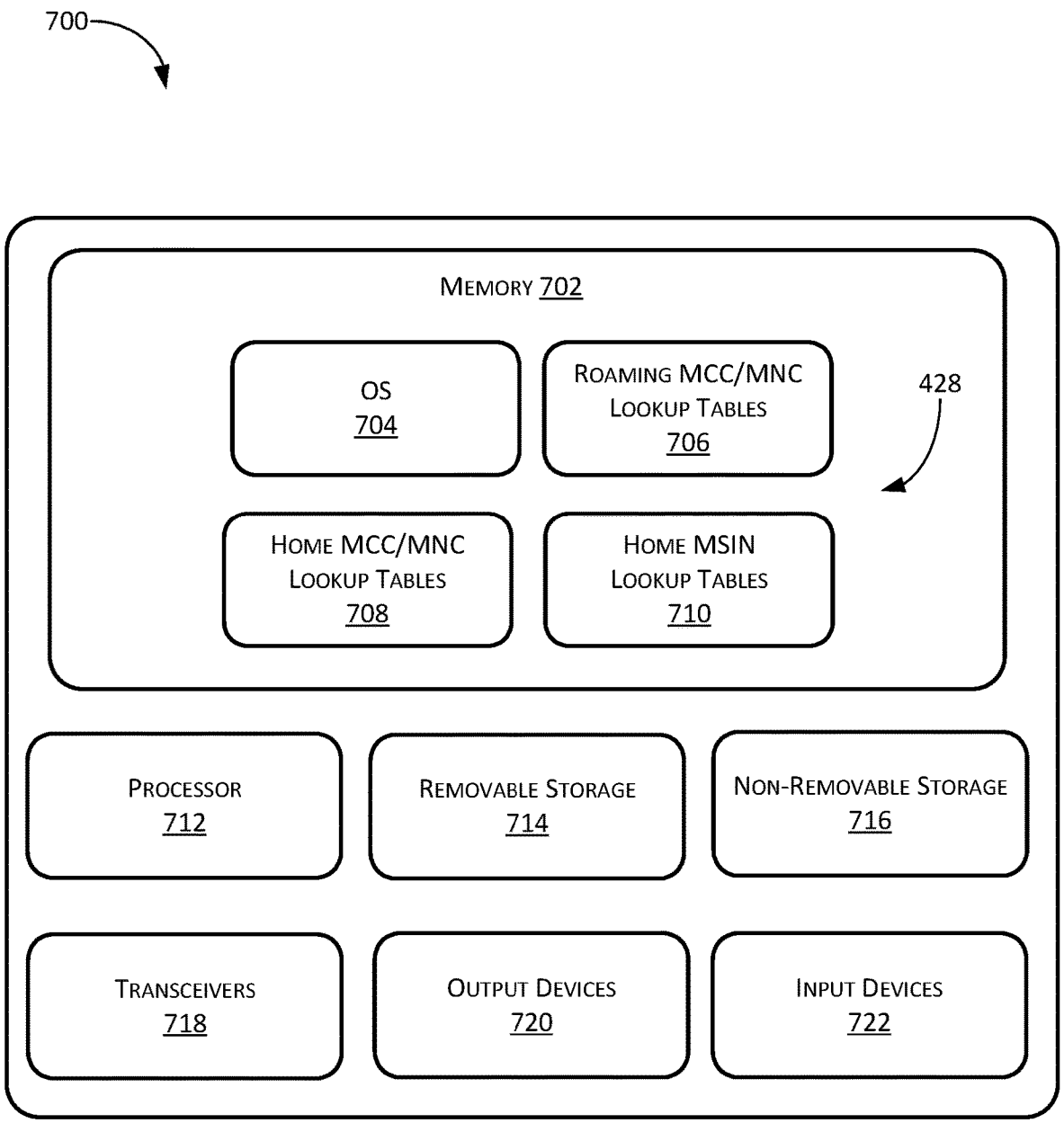
FIG. 7 is an example of a server for use with the systems and methods disclosed herein, in accordance with some examples of the present disclosure.

As shown in FIG. 7, the methods 100, 200, 300 can be implemented on one or more network entities. In some examples, the methods 100, 200, 300 and lookup tables 428 (e.g., Tables 1-4) can be stored on the HLR/HSS 426. In other examples, some or all of the methods 100, 200, 300 and/or lookup tables 428 can be stored on another network entity (e.g., The 3GPP AAA server 430 or SAE GW 418) and accessed by the HLR/HSS 426. In still other examples, some, or all of the methods 100, 200, 300 and/or lookup tables 428 can be stored on a standalone server and accessed by the HLR/HSS 426. These network entities—e.g., the HLR/HSS 426, 3GPP AAA server 430, and SAE GW 418—and/or a standalone server are essentially just specialized servers. To simplify and clarify explanation, therefore, these components are described below simply in terms of a "server" 700.

The server 700 can comprise a number of components to execute the above-mentioned functions and apps. As discussed below, the server 700 can comprise memory 702 including, for example, an OS 704, roaming MCC/MNC lookup tables 706, home MCC/MNC lookup tables 708, and home MSIN lookup tables 710. In various implementations, the memory 702 can be volatile (such as RAM), non-volatile (such as ROM, flash memory, etc.), or some combination of the two. The memory 702 can include all, or part, of the functions 706, 708, 710 for the server 700, among other things.

The memory 702 can also include the OS 704. Of course, the OS 704 varies depending on the manufacturer of the server 700 and the type of component. Many servers, for example, run Linux or Windows Server. Dedicated cellular routing servers may run specific telecommunications OSs 704. The OS 704 contains the modules and software that support a computer's basic functions, such as scheduling tasks, executing applications, and controlling peripherals. The OS 704 can enable the server to receive the MCC/MNC and/or MSIN, locate these numbers in the lookup tables 428, establish sessions with TASs 512, etc.

In this case, the server 700 can also include the lookup tables 428. So, for example, the lookup tables 428 can be included in the roaming MCC/MNC lookup tables 706, home MCC/MNC lookup tables 708, and home MSIN lookup tables 710. In the examples above, Tables 1 and 3 can be included in the home MCC/MNC lookup tables 708, Table 2 can be included in the roaming MCC/MNC lookup tables 706, and Table 4 can be included in the home MSIN lookup tables 710. Of course, different or additional tables for additional MCC/MNCs and MSINs can also be included in any of these functions 706, 708, 710.

The server 700 can also comprise one or more processors 712. In some implementations, the processor(s) 712 can be a central processing unit (CPU), a graphics processing unit (GPU), or both CPU and GPU, or any other sort of processing unit. The server 700 can also include one or more of removable storage 714, non-removable storage 716, transceiver(s) 718, output device(s) 720, and input device(s) 722.

The server 700 may also include additional data storage devices (removable and/or non-removable) such as, for example, magnetic disks, optical disks, or tape. Such additional storage is illustrated in FIG. 7 by removable storage 714 and non-removable storage 716. The removable storage 714 and non-removable storage 716 can store some, or all, of the OS 704 and functions 706, 708, 710.

Non-transitory computer-readable media may include volatile and nonvolatile, removable and non-removable tangible, physical media implemented in technology for storage of information, such as computer readable instructions, data structures, program modules, or other data. The memory 702, removable storage 714, and non-removable storage 716 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the server 700. Any such non-transitory computer-readable media may be part of the server 700 or may be a separate database, databank, remote server, or cloud-based server.

In some implementations, the transceiver(s) 718 include any sort of transceivers known in the art. In some examples, the transceiver(s) 718 can include wireless modem(s) to facilitate wireless connectivity with the UE, the Internet, the cellular network, and/or an intranet via a cellular connection. Further, the transceiver(s) 718 may include a radio transceiver that performs the function of transmitting and receiving radio frequency communications via an antenna (e.g., Wi-Fi or Bluetooth®) to connect to the IP network 414. In other examples, the transceiver(s) 718 may include wired communication components, such as a wired modem or Ethernet port. The transceiver(s) 718 can enable the server 700 to communicate with UEs 402, 404 and with other network entities (e.g., the 3GPP AAA server 430 or TASs 512).

In some implementations, the output device(s) 720 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the server 700 is connected to a network, when a new MCC/MNC or MSIN is received, when a UE 402, 404 is unauthorized to connect to the network, etc. Output device(s) 720 may also include ports for one or more peripheral devices, such as headphones, peripheral speakers, or a peripheral display.

In various implementations, input device(s) 722 include any sort of input devices known in the art. For example, the input device(s) 722 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

While several possible examples are disclosed above, examples of the present disclosure are not so limited. For instance, while the systems and methods above are discussed with reference to use with cellular communications, the systems and methods can be used with other types of wired and wireless communications. In addition, while various functions are discussed as being performed on the HLR/HSS 426 or the S-CSCF 506, other components, such as other network entities, could perform the same or similar functions without departing from the spirit of the invention. Indeed, the methods 100, 200, 300 can be applied to virtually any network where allocation of services is desired.

Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
receiving, with one or more transceivers of a home subscriber server (HSS), a mobile country code and mobile network code (MCC/MNC) from a user equipment (UE) attempting to connect to a communications network associated with the HSS;
determining, with one or more processors of the HSS, that the MCC/MNC is a home MCC/MNC for the communications network;
receiving, with the one or more transceivers of the HSS, a mobile subscriber identification number (MSIN) from the UE;
determining, with the one or more processors, whether the MSIN is an allocated MSIN or an unallocated MSIN;
determining, with the one or more processors, a home initial filter criteria (IFC) associated with the UE based on the MSIN; and
sending, with the one or more transceivers of the HSS, the home IFC to a serving call session control function (S-CSCF),
wherein the home IFC is a default home IFC associated with the unallocated MSIN or a new home IFC that corresponds to an MSIN range in a home MSIN lookup table that includes the allocated MSIN.

2. The method of claim 1, wherein the default home IFC authorizes the UE to access all services on the communications network.

3. The method of claim 1, wherein the home IFC identifies, on a service-by-service basis, a set of one of more services of a plurality of services that the UE is authorized to access via the communications network.

4. The method of claim 3, wherein the home IFC authorizes the S-CSCF to establish one or more sessions for the UE with one or more application servers (ASs) associated with the set of one or more services that the UE is authorized to access.

5. The method of claim 1, wherein the home MSIN lookup table includes:
a plurality of MSIN ranges of MSINs;
a first IFC for a first MSIN range of the plurality of MSIN ranges; and
a second IFC for a second MSIN range of the plurality of MSIN ranges,
wherein the first IFC is different than the second IFC.

6. The method of claim 5, wherein the first IFC authorizes the UE to make voice calls only.

7. A network entity associated with a communications network, the network entity comprising:
one or more transceivers;
memory storing one or more of a default home initial filter criteria (IFC) and a home mobile subscriber identification number (MSIN) lookup table; and
one or more processors in communication with at least the one or more transceivers and the memory, the memory including computer executable instructions that, when executed by the one or more processors, cause the network entity to perform operations comprising:
receiving a mobile country code and mobile network code (MCC/MNC) from a user equipment (UE) attempting to connect to the communications network;
determining that the MCC/MNC is a home MCC/MNC for the communications network;
receiving an MSIN from the UE;
determining whether the MSIN is an allocated MSIN or an unallocated MSIN;
determining a home IFC associated with the UE based on the MSIN; and
sending the home IFC to a serving call session control function (S-CSCF),
wherein the home IFC is the default home IFC associated with the unallocated MSIN or a new home IFC that corresponds to an MSIN range in the home MSIN lookup table that includes the allocated MSIN.

8. The network entity of claim 7, wherein the network entity is a home subscriber server (HSS).

9. The network entity of claim 7, wherein the default home IFC authorizes the UE to access all services on the communications network.

10. The network entity of claim 7, wherein the home IFC identifies, on a service-by-service basis, a set of one of more services of a plurality of services that the UE is authorized to access via the communications network.

11. The network entity of claim 10, wherein the home IFC authorizes the S-CSCF to establish one or more sessions for the UE with one or more application server (ASs) associated with the set of one or more services that the UE is authorized to access.

12. The network entity of claim 7, wherein the home MSIN lookup table includes:
a plurality of MSIN ranges of MSINs;
a first IFC for a first MSIN range of the plurality of MSIN ranges; and
a second IFC for a second MSIN range of the plurality of MSIN ranges,
wherein the first IFC is different than the second IFC.

13. The network entity of claim 12, wherein the first IFC authorizes the UE to make voice calls only.

14. One or more non-transitory computer-readable media storing computer-executable instructions that, when executed by one or more processors of a network entity, cause the network entity to perform operations comprising:
receiving a mobile country code and mobile network code (MCC/MNC) from a user equipment (UE) attempting to connect to a communications network associated with the network entity;
determining that the MCC/MNC is a home MCC/MNC for the communications network;
receiving a mobile subscriber identification number (MSIN) from the UE;
determining whether the MSIN is an allocated MSIN or an unallocated MSIN;
determining a home initial filter criteria (IFC) associated with the UE based on the MSIN; and
sending the home IFC to a serving call session control function (S-CSCF),
wherein the home IFC is a default home IFC associated with the unallocated MSIN or a new home IFC that corresponds to an MSIN range in a home MSIN lookup table that includes the allocated MSIN.

15. The one or more non-transitory computer-readable media of claim 14, wherein the network entity is a home subscriber server (HSS).

16. The one or more non-transitory computer-readable media of claim 14, wherein the default home IFC authorizes the UE to access all services on the communications network.

17. The one or more non-transitory computer-readable media of claim 14, wherein the home IFC identifies, on a service-by-service basis, a set of one of more services of a plurality of services that the UE is authorized to access via the communications network.

18. The one or more non-transitory computer-readable media of claim 17, wherein the home IFC authorizes the S-CSCF to establish one or more sessions for the UE with one or more application server (ASs) associated with the set of one or more services that the UE is authorized to access.

19. The one or more non-transitory computer-readable media of claim 14, wherein the home MSIN lookup table includes:
- a plurality of MSIN ranges of MSINs;
- a first IFC for a first MSIN range of the plurality of MSIN ranges; and
- a second IFC for a second MSIN range of the plurality of MSIN ranges,
- wherein the first IFC is different than the second IFC.

20. The one or more non-transitory computer-readable media of claim 19, wherein the first IFC authorizes the UE to make voice calls only.

\* \* \* \* \*